United States Patent [19]

Iijima et al.

[11] 4,149,390
[45] Apr. 17, 1979

[54] EVAPORATOR

[75] Inventors: Toshiki Iijima; Reijiro Takahashi, both of Katsuta; Tosikazu Ito, Ibaraki, all of Japan

[73] Assignee: Hitachi, Ltd., Tokyo, Japan

[21] Appl. No.: 846,218

[22] Filed: Oct. 27, 1977

[30] Foreign Application Priority Data

Nov. 1, 1976 [JP] Japan ................. 51-130510

[51] Int. Cl.² ............................................. F25B 39/02
[52] U.S. Cl. ..................................... 62/524; 62/525; 165/40; 165/176
[58] Field of Search ................. 62/225, 525, 527, 524; 165/40 X, 176

[56] References Cited

U.S. PATENT DOCUMENTS

| | | | |
|---|---|---|---|
| 1,120,159 | 12/1914 | Pollard | 62/225 |
| 1,792,090 | 2/1931 | Haupt | 165/40 |
| 1,957,036 | 5/1934 | Baars | 62/527 |
| 2,586,998 | 2/1952 | Schlenz | 165/40 |
| 2,642,724 | 6/1953 | Carter | 62/225 |
| 2,669,099 | 2/1954 | Malkoff | 62/525 |
| 3,990,504 | 11/1976 | Kolthoff | 165/40 |

Primary Examiner—Ernest R. Purser
Assistant Examiner—Henry Raduazo

[57] ABSTRACT

An evaporator including a side plate formed with a number of openings each having rigidly secured therein the upper end portion of one of a number of U-shaped refrigerant tubes, a cover plate attached to the upper surface of the side plate and formed, by recessing its inner surface, with a plurality of bend sections each intercommunicating the upper end portions of the two tubes of the adjacent U-shaped refrigerant tubes forming a set, a distributor section for supplying a suitable refrigerant to refrigerant passages provided by the U-shaped tubes and the bend sections, a manifold section for collecting the refrigerant from the refrigerant passages and discharging same therefrom, and an expansion valve section extending between the distributor section and the manifold section in a manner to intercommunicate the two sections, and an expansion valve assembly mounted in the expansion valve section. In this evaporator, the refrigerant supplied through a high pressure refrigerant pipe connected to the cover plate passes through a valve section of the expansion valve assembly into the distributor section, from which the refrigerant flows through the tortuous refrigerant passages provided by the U-shaped tubes and the bend sections. The refrigerant changes into a gaseous state while flowing through the refrigerant passages, and the gaseous refrigerant is collected in the manifold section, from which it passes through a control section of the expansion valve assembly into a low pressure refrigerant pipe.

5 Claims, 5 Drawing Figures

EVAPORATOR

BACKGROUND OF THE INVENTION

This invention relates to evaporators used with cooling systems for cooling the spaces in the bodies of motor vehicles, and more particularly to an evaporator of the type which has an expansion valve mounted in the evaporator to provide a unitary structure.

In cooling systems of the prior art intended for the aforementioned use, the expansion valve is mounted in a pipe connected to the evaporator, and the expansion valve and the evaporator are mounted separately. This results in the evaporator and the expansion valve occupying a considerably large space. Also, if the expansion valve is supported by a pipe, then violent vibrations of the motor vehicles are directly transmitted to the expansion valve and render unstable the control effected by the expansion valve. Moreover, a torque produced by the weight of the expansion valve acts on connections between the pipe and expansion valve and the pipe and evaporator, thereby causing crack formation and a leaking of the refrigerant through the cracks. Since the cooling systems for cooling the spaces in the bodies of motor vehicles are used under severe conditions of a high thermal load, it is necessary to use a charge of refrigerant of a greater quantity than the charge of refrigerant used in ordinary space coolers or refrigerating apparatus. To this end, an evaporator used with a motor vehicle cooling system includes a plurality of cooling units connected in parallel with one another, and a refrigerant is distributed to the cooling units through a plurality of distributor pipes from a distributor mounted at the end of a pipe connected to the posterior stage of an expansion valve. As a result, the piping around the evaporator is complex and a difficulty is experienced in efficiently performing a piping work. In addition, the presence of many connections reduces the productivity of the cooling systems and causes an increase in the incidence of accidents involving leaking of the refrigerant. Thus the evaporator becomes low in reliability.

In U.S. application Ser. No. 743,492 filed on Nov. 19, 1976 under the title "EVAPORATOR" now U.S. Pat. No. 4,114,397, a proposal is made to use a side plate of the evaporator and two cover plates provided on the side plate in airtight relation to form refrigerant distributing passages, an expansion valve housing, a refrigerant collecting section and U-bend sections for the purpose of simplifying the arrangement of pipes. Japanese Patent Publication No. 26334/77 entitled "EVAPORATOR FOR COOLING SYSTEM" filed on Sept. 6, 1972 discloses art which is similar to the art described above.

The present invention relates to improvements in the prior application or prior art.

SUMMARY OF THE INVENTION

An object of the invention is to simplify the construction of the evaporator of the type described by reducing the number of parts.

Another object is to improve the efficiency with which assembling of the parts is carried out, by reducing the number of portions to be joined.

Another object is to simplify the shapes of parts constituting an evaporator, so that the evaporator can be fabricated by following simple working steps.

One of the characterizing features of the present invention is that the evaporator comprises a cover plate formed in its inner surface with four types of recesses, a side plate formed with a plurality of openings each having rigidly secured therein the upper end portion of one of a number of U-shaped tubes, an expansion valve assembly fixedly housed in a space defined between the first recess in the cover plate and the side plate, a distributor section defined between the second recess in the cover plate and the side plate, a manifold section defined between the third recess in the cover plate and the side plate, a plurality of bend sections defined between the fourth recess in the cover plate and the side plate, and a refrigerant passageway wherein a suitable refrigerant introduced through a high pressure refrigerant pipe flows into a valve section of the expansion valve assembly in which the refrigerant undergoes adiabatic expansion and from which it is introduced through the distributor section to the U-shaped tubes to be changed into a gaseous state while flowing through serpentine tubes formed by the U-shaped tubes and the bend sections, so that the refrigerant in the gaseous state is collected in the manifold section and flows around a control section of the expansion valve assembly into a low pressure refrigerant pipe.

Another characterizing feature is that the evaporator comprises the second recess and the third recess formed in the inner surface of the cover plate, the first recess maintaining the first and second recesses in communication with each other, the expansion valve assembly securely housed in the first recess, and sealing means located around the expansion valve assembly for preventing direct communication between the first and second recesses.

Another characterizing feature is that the valve section and the control section constituting the expansion valve assembly securely housed in the first recess and a valve stem interconnecting the two sections are arranged in series in a space on a horizontal plane which is parallel to the side plate.

DESCRIPTION OF THE PREFERRED EMBODIMENT

Figure 1:
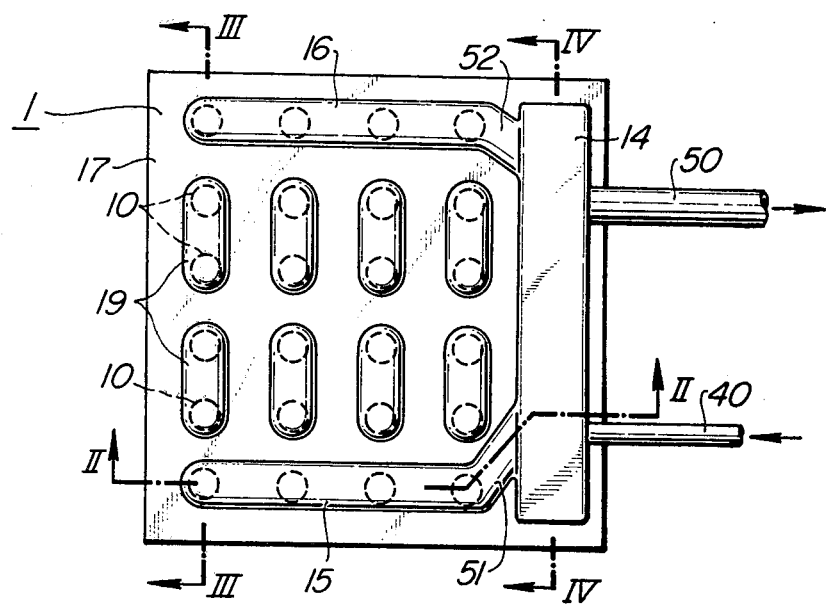
FIG. 1 is a plan view of the evaporator comprising one embodiment of the present invention.
Figure 2:
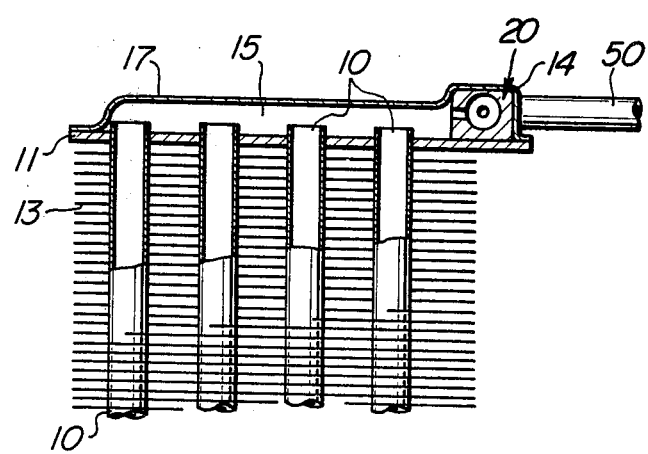
FIG. 2 is a sectional view taken along the line II—II in FIG. 1.
Figure 3:
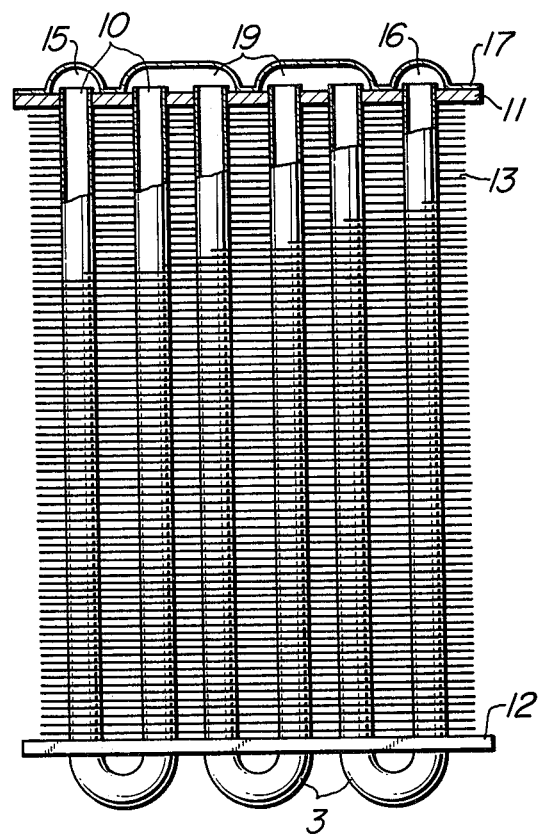
FIG. 3 is a sectional view taken along the line III—III in FIG. 1.

FIGS. 1 to 3 show one embodiment of the evaporator according to the invention. The evaporator generally designated by the reference numeral 1 comprises a multitude of plate fins 13 arranged horizontally to be vertically spaced apart from one another a suitable distance, four refrigerant tube units 3 located vertically to extend through the plate fins 13 so as to provide a serpentine tube arrangement, upper and lower side plates 11 and 12 rigidly supporting the plate fins 13 and the refrigerant tube units 3 at the upper and lower ends of the tube units 3, a cover plate 17 attached to the upper surface of the upper side plate 11, and an expansion valve assembly 20 securedly mounted between the upper side plate 11 and the cover plate 17.

Referring to FIGS. 2 and 3, a plurality of U-shaped refrigerant tubes 10 forming each refrigerant tube unit 3 extend vertically through the upper side plate 11, plate fins 13 and lower side plate 12 arranged in vertically spaced layers, and each U-shaped refrigerant tube 10 extends through the upper side plate 11 to open in a space thereabove. The refrigerant tubes 10 are rigidly joined to the side plate 11 in airtight relation by means of brazing, soldering, adhesive bonding or welding.

The cover plate 17 formed in its inner surface with recesses corresponding to an expansion valve section 14, a distributor section 15, and a manifold section 16 is provided on the side plate 11.

The cover plate 17 is also formed with bend sections 19 for connecting the refrigerant tubes 10 in series with one another.

The cover plate 17 formed with these recesses may be produced by working a thin sheet of aluminum or an aluminum alloy by means of a press, or may be made of a synthetic resinous material by injection molding.

When the side plate 11 and the cover plate 17 are combined with each other, they are joined in airtight relation at portions thereof which exclude the recesses formed in the latter. The two plates 11 and 17 may be joined by soldering, brazing or adhesive bonding.

Referring to FIG. 1 again, the refrigerant flow passages of this evaporator extend from the distributor section 15 in the lower portion of the drawing through the U-shaped refrigerant tubes 10 and the bend sections 19 to the manifold section 16 in the upper portion of the drawing.

Thus the refrigerant flow passages function as if four serpentine tubes were arranged in parallel with one another between the distributor section 15 and the manifold section 16.

In the embodiment shown and described hereinabove, each refrigerant tube unit 3 includes three U-shaped tubes 10 arranged in a row. In each refrigerant tube unit 3, four ends of the tubes except for the end of the tube connected to the distributor section 15 and the end of the tube connected to the manifold section 16 are connected together by means of two bend sections 19 in such a manner that the ends of the two tubes of the adjacent U-shaped tubes 10 form a set and are interconnected by one bend section 19, as shown in FIG. 3.

The expansion valve section 14 is disposed in parallel with the bend sections 19 arranged in two stages and four rows, and connected at opposite ends thereof to the distributor section 15 and the manifold section 16 as shown in FIG. 1.

The cover plate 17 of this construction includes an upper half portion and a lower half portion which are symmetrical with respect to an imaginary line dividing the bend sections 19 of the upper stage from those of the lower stage.

If each refrigerant tube unit 3 has one more U-shaped tube 10 and consequently the bend sections 19 are arranged in three stages, an imaginary line dividing the cover plate 17 into upper and lower half portions in symmetrical relation will be disposed in a position in which the line divides each of the bend sections 19 of the intermediate stage into two equal halves.

The evaporator 1 which is of simple construction as aforesaid offers the advantage of its volume not being increased much even if the expansion valve is mounted therein to provide a unitary structure.

The side plate 11 on which the expansion valve is mounted has a larger area than the side plate 12 on which no expansion valve is mounted, in order to provide a space for mounting the expansion valve and rigidly securing same therein.

It is not essential to arrange the U-shaped tubes 10 in alignment as shown in FIG. 1. The U-shaped tubes may be arranged in staggered relationship. If this is the case, all the bend sections 19 should be inclined in the same direction.

Figure 4:
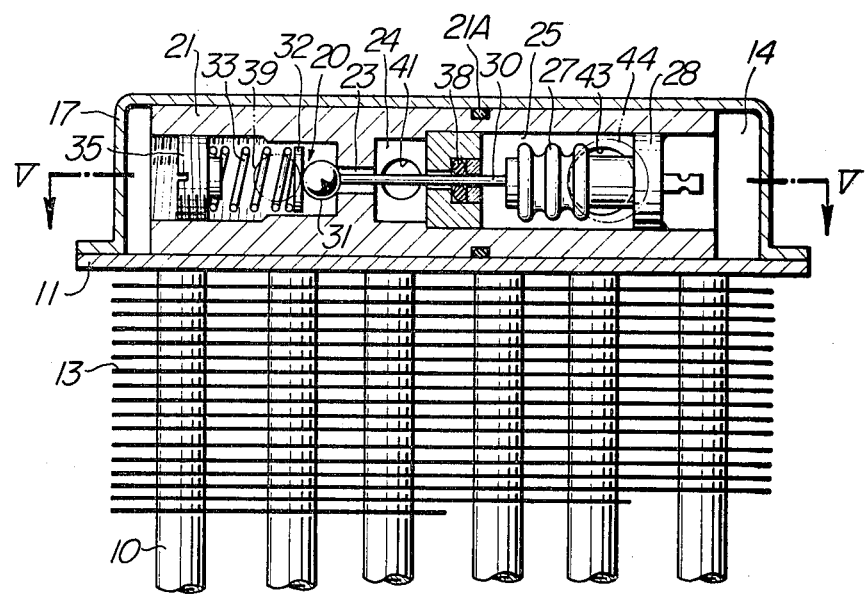
FIG. 4 is a sectional view, on an enlarged scale, taken along the line IV—IV in FIG. 1.
Figure 5:
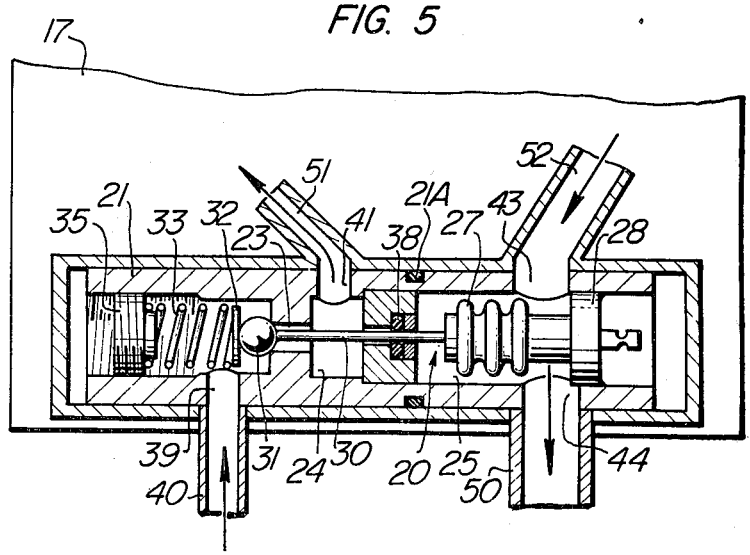
FIG. 5 is a sectional view taken along the line V—V in FIG. 4.

FIGS. 4 and 5 show in detail the expansion valve section 14 which mounts therein the expansion valve assembly 20 contained in an expansion valve housing 21 which is formed with an orifice 23, a primary chamber 24 and a secondary chamber 25. Mounted in the secondary chamber 25 is a metallic bellows 27 which is adapted to be displaced in accordance with changes in the pressure and temperature in the secondary chamber 25. The metallic bellows 27 is secured at one end to the housing 21 through an end plate 28, and connected at the other end through a valve stem 30 to a spherical valve 31 which is normally biased rightwardly in FIGS. 4 and 5 by a spring 33 through a spring seat 32 so as to close the orifice 23. By turning an adjusting screw 35, it is possible to adjust the biasing force of the spring 33. A packing 38 is mounted around the valve stem 30 in a portion thereof which extends through a dust in a wall separating the primary chamber 24 from the secondary chamber 25 so as to provide an airtight seal to this portion of the expansion valve assembly. A chamber in which the spherical valve 31 and spring 33 are disposed is formed with a port 39 for communicating the chamber with a high pressure refrigerant pipe 40. The primary chamber 24 is formed with a port 41 for communicating the chamber 24 with the distributor section 15, while the secondary chamber 25 is formed with a port 43 for communicating the chamber 25 with the manifold section 16 and with a port 44 for communicating the chamber 25 with a low pressure refrigerant pipe 50.

The port 41 communicates with the distributor section 15 through a communicating passage 51 formed in the cover plate 17, and the port 43 communicates with the manifold section 16 through a communicating passage 52 also formed in the cover plate 17.

A refrigerant of high pressure in a liquid state is supplied through the high pressure refrigerant passage 40 and passes through a small gap between the orifice 23 and the spherical valve 31. At this time, the refrigerant rapidly expands and flows from the primary chamber 24 through the communicating passage 51 into the distributor section 15 in which the refrigerant is divided into four streams flowing through the four refrigerant tube units 3. Since the refrigerant tubes 10 of each refrigerant tube unit 3 are connected in series with the refrigerant tubes 10 of the next stage through the bend sections 19 formed in the cover plate 17, the refrigerant flowing through the tubes 10 of each refrigerant tube unit 3 flows back and forth in the tubes 10 which extend through the multitude of fin plates 13 arranged in vertically spaced relation around the tubes 10. A current of air flowing in the evaporator 1 flows along the fin plates 13. In FIG. 1, the air current flows from the lower portion to the upper portion of the drawing along the plane thereof.

The streams of refrigerant that have flowed through the refrigerant pipes 10 of the last stage are collected in the manifold section 16 into a single stream of refrigerant which flows through the communicating passage 52 into the secondary chamber 25, from which it flows through the low pressure refrigerant pipe 50 to a compressor (not shown). At this time, if the refrigerant introduced into the secondary chamber 25 has a high temperature or a low pressure, the metallic bellows 27 will expand to move the spherical valve 31 leftwardly. This increases the size of the gap between the spherical valve 31 and the orifice 23, thereby enabling a larger quantity of refrigerant to flow through the communicating passage 51 to the distributor section 15.

The expansion valve assembly 20 functions in the same manner as expansion valves of the prior art. That is, the expansion valve assembly 20 control the quantity of refrigerant introduced into the inlet side of the evaporator in accordance with the temperature and pressure of the refrigerant on the outlet side thereof.

In the embodiment shown and described hereinabove, the cover plate 17 is formed in its inner surface, as by working a metal sheet by means of a press, with recesses which correspond to the expansion valve section 14, distributor section 15, manifold section 16 and bend sections 19, and the cover plate 17 of this shape is combined with the side plate 11 to provide the required spaces. It is to be understood that the bend sections 19 may be replaced by conventional U-bends.

The cover plate 17 can be shaped readily as desired by working an aluminum sheet by means of a press. The cover plate 17 may be joined to the side plate 11 connected thereto by means of bolts in positions other than the positions of the refrigerant passages. The expansion valve section 14 formed in the cover plate 17 is formed to be of a square shape in cross section as shown in FIG. 2 and has an opening in its lower portion or the portion facing the side plate 11. The expansion valve assembly 20 can be inserted through this opening. The dimensional relation between the assembly 20 and the valve section 14 is determined such that there is no gap between the outer peripheries of the expansion valve housing 21 and the inner surfaces of the expansion valve section 14. In case the gap is so large that the refrigerant leaks through the gap and flows from the ports 39 and 41 to the ports 43 and 44, it is necessary to mount a packing 21A (FIGS. 4, 5) in a manner to surround the housing 21 in order to disconnect these ports and prevent the leakage of refrigerant.

If the cover plate 17 is joined to the side plate 11 by brazing, it is effective to cut shallow grooves at the joints of the two plates in order to prevent the excess molten filler metal from obturating the refrigerant passages.

It is to be understood that the invention is not limited to the specific form of the expansion valve assembly shown and described hereinabove which is a rectangular parallelepiped, and that the expansion valve assembly may be semicircular in cross section depending on the shape of the expansion valve section 14.

In the evaporator constructed as aforesaid, the expansion valve can be mounted between a single cover plate and a side plate, thereby enabling the piping connecting the distributor to the expansion valve to be eliminated. It is also possible to eliminate the piping connecting the manifold to the secondary chamber of the expansion valve.

The cover plate according to the invention can be readily shaped by working a sheet metal as by means of a press. This greatly improves the efficiency with which the evaporators are fabricated.

If the bend sections are formed integrally with the cover plate as is the case with the embodiment described, the header section of the evaporator becomes less cumbersome or more beautifully shaped than the corresponding section of evaporators of the prior art, and it is possible to reduce by 30% the volume occupied by the header section in all the volume of an evaporator.

What is claimed is:

1. An evaporator comprising:
    a multitude of plate fins arranged to provide horizontally extending layers vertically spaced apart from one another a suitable distance;
    more than one set of refrigerant tube unit each providing a tortuous refrigerant passage extending through said plate fins;
    a pair of side plates fixedly supporting said plate fins and said refrigerant tube unit at opposite ends thereof;
    a cover plate attached to one of said side plates to provide a unitary structure;
    a distributor section formed between said side plate and said cover plate and connected to an inlet end portion of each said refrigerant tube unit;
    a manifold section formed between said side plate and said cover plate and connected to an outlet end portion of each said refrigerant tube unit;
    an expansion valve section formed between said side plate and said cover plate and connected to both said distributor section and said manifold section;
    an expansion valve assembly mounted in said expansion valve section in such a manner that a throttling section of the expansion valve assembly is located on the distributor section side of the expansion valve section and a control section thereof is located on the manifold section side of the expansion valve section;
    a high pressure refrigerant pipe connected to said cover plate for introducing a refrigerant to said distributor section through said throttling section; and
    a low pressure refrigerant pipe connected to said cover plate for discharging the refrigerant from said manifold section through said control section.

2. An evaporator as set forth in claim 1, wherein each said refrigerant tube unit consists of U-shaped tubes and U-bends.

3. An evaporator as set forth in claim 1, further comprising sealing means provided between said expansion valve assembly and said cover plate.

4. An evaporator as set forth in claim 1, wherein each said refrigerant tube unit consists of U-shaped tubes and bend sections formed between said side plate and said cover plate.

5. An evaporator as set forth in claim 1, wherein the distributor section side of the evaporator and the manifold section side of the evaporator are substantially linearly symmetrical with respect to a line connecting points disposed equidistantly from the distributor section and the manifold section.

* * * * *